United States Patent

Snook et al.

[15] 3,700,862

[45] Oct. 24, 1972

[54] INDICIA SYSTEM FOR CREDIT CARDS AND THE LIKE

[72] Inventors: Richard K. Snook, Bridgeton; Rodney W. Stout, Webster Groves, both of Mo.

[73] Assignee: Diginetics Incorporated

[22] Filed: Aug. 26, 1969

[21] Appl. No.: 853,138

[52] U.S. Cl. .......... 235/61.12 M

[51] Int. Cl. .......... G06k 19/00

[58] Field of Search .....235/61.12 M, 61.114, 61.7 B, 235/61.12 R, 61.12 N; 340/149 A, 149 R

[56] References Cited

UNITED STATES PATENTS

| | | | |
|---|---|---|---|
| 2,508,953 | 5/1950 | Knutsen | 235/61.12 N |
| 2,254,931 | 9/1941 | Bryce | 235/61.12 M |
| 2,704,634 | 3/1955 | Rauch | 235/61.12 N |
| 3,614,394 | 10/1971 | Bindshedler | 235/61.9 R |
| 2,833,475 | 5/1958 | Dedek | 235/61.12 M |
| 3,394,246 | 7/1968 | Goldman | 235/61.7 B |
| 3,052,564 | 9/1962 | Kulesza | 235/61.12 M |
| 2,640,647 | 6/1953 | Rand, Jr. | 235/61.12 M |
| 2,952,008 | 9/1960 | Mitchell et al. | 235/61.12 M |
| 3,211,470 | 10/1965 | Wilson | 235/61.12 M |
| 3,453,598 | 7/1969 | Schweizer | 235/61.7 B |
| 3,512,130 | 5/1970 | Hulett | 235/61.7 B |
| 3,531,627 | 9/1970 | Ham | 235/61.12 M |

*Primary Examiner*—Daryl W. Cook
*Attorney*—Robert J. Schaap

[57] ABSTRACT

A system for imprinting indicia in binary form on credit cards and similar plastic members which includes a printing mechanism for printing two tracks of clock or synchronizing pulses and two tracks of data pulses on spaced portions of a credit card. One data track is recorded in such manner that it is a complement of the other data track in order to provide at least 100 percent redundancy. A reading system is also disclosed and which involves a gating structure for determining true states of the complementary data in each of the data tracks at clock pulse time. In addition, the reading system compensates for a condition of skew in the printing or in the reading of the card.

11 Claims, 21 Drawing Figures

PATENTED OCT 24 1972 3,700,862

INVENTORS
RICHARD K. SNOOK
RODNEY W. STOUT
BY
Robert J. Schaap
ATTORNEY

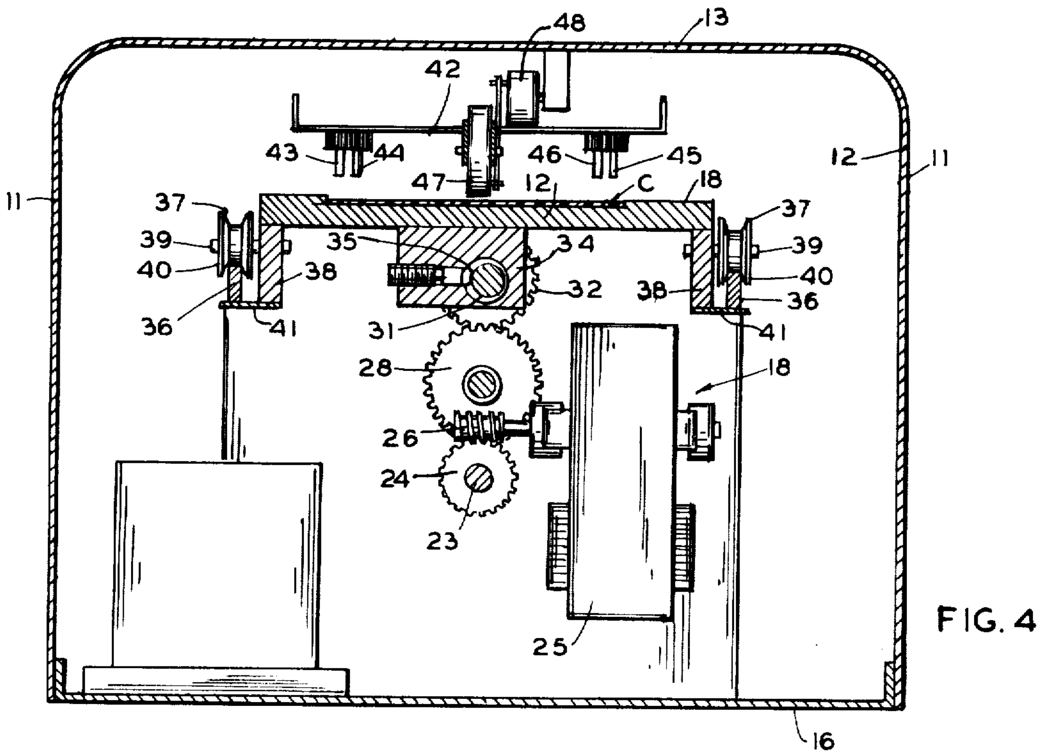
FIG. 4
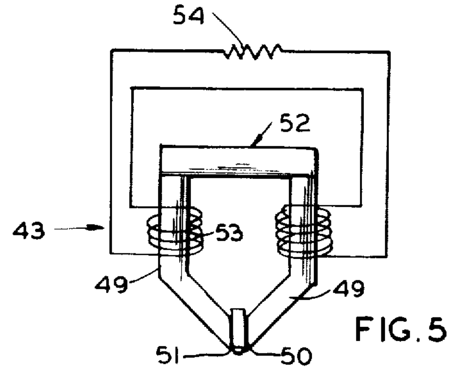
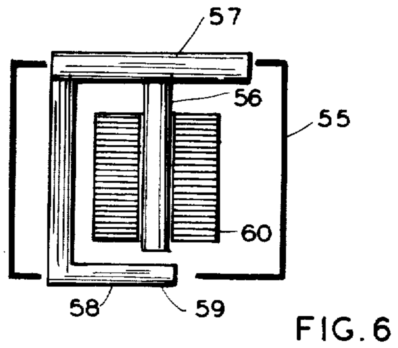
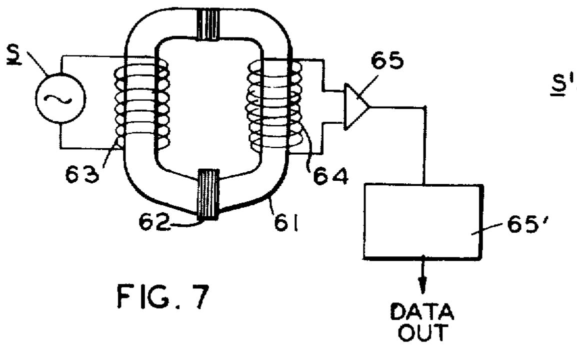
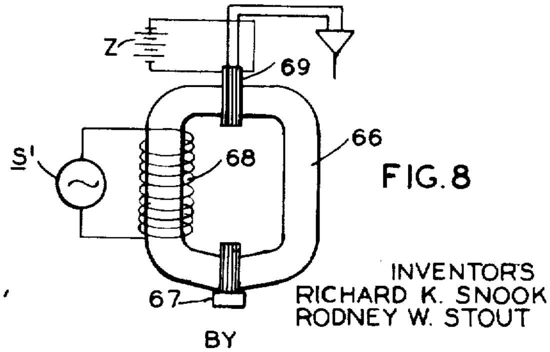
FIG. 8
INVENTORS
RICHARD K. SNOOK
RODNEY W. STOUT
BY
Robert J. Schaap
ATTORNEY INVENTORS
RICHARD K. SNOOK
RODNEY W. STOUT
BY
Robert J. Schaap
ATTORNEY RICHARD K. SNOOK
RODNEY W. STOUT
BY
Robert J. Schaap
ATTORNEY INVENTORS
RICHARD K. SNOOK
RODNEY W. STOUT
BY
Robert J. Schaap
ATTORNEY INVENTORS
RICHARD K. SNOOK
RODNEY W. STOUT
BY
Robert J. Schaap
ATTORNEY

INDICIA SYSTEM FOR CREDIT CARDS AND THE LIKE

This invention relates in general to certain new and useful improvements in systems for credit cards and similar information bearing members having indicia imprinted thereon and systems for printing and reading the indicia, and more particularly, to credit cards having indicia imprinted on the card in such manner that inherent redundancy is created, and systems for both recording the data thereon and reading the data in order to determine validity of the credit card.

In our present day economy, purchases of goods and services on a credit basis has become a commonly accepted manner of doing business and accounts for a large part of the Gross National Product. Almost every available commodity can be purchased on a credit transaction and the number of companies now employing credit cards as a means of recording such transactions has significantly increased in the past few years. Many of the companies employ rigorous investigation procedures where each of the applicants for credit cards is examined for credit risks. Notwithstanding, the initial issuance of the card based on such investigations, many of the card holders are subsequently classified as bad or poor credit risks. The problem is even more acute in the case of stolen credit cards where the possessor thereof may purchase large quantities of goods and services to the financial detriment of the equitable card owner or to the company issuing the card. However, attempts to discover and repossess the invalid card are not only difficult and costly, but oftentimes futile.

Recent attempts at forging credit cards has become a very acute problem for many credit card issuers since the merchant issuing the good or service oftentimes does not have means for detecting counterfeit credit cards. Credit cards extant in the present day economy generally involves simple production procedures where the card is stamped from a sheet of plastic, suitably imprinted with desired information and embossed to generally include the name of the holder and a particular credit card account number issued to the holder of the card. Accordingly, cards of this type are quite easy to counterfeit.

Many credit card issuers have resorted to the periodic and frequent issuance of lists of bad credit card numbers. It was therefore incumbent upon the retailer to check each customer credit card against the list of bad numbers. A careful comparison of the customer card with the list of bad card numbers generally takes several minutes and is subject to observational error. In addition, many establishments issuing goods and services on a credit transaction will not benefit themselves of the service of a bad card list due to the possible alienation of the customer. As a result of these problems, many retail establishments have deemed it feasible to forego the desirability of checking the credit card and suffering the risk of possible loss.

In order to obviate this problem, there has been a recent introduction into the market of a number of commercially available apparatus such as that described in U.S. Pat. Nos. 3,184,714 or 3,315,230, for electronically comparing customer credit cards with the stored list of invalid card numbers. While these credit card verifiers have been found to be quite useful in rendering a comparison of a credit card with a stored list of invalid cards, they have been found to be generally ineffective with regard to introducing the card number into the verifier. There are a number of techniques for introducing a card holder's number into the verifier, namely, by means of a keyboard where the operator physically introduces the number into the verifier or by means of a mechanical feeler system where the embossed card number is mechanically sensed. However, this latter technique for reading a card is subject to the introduction of a large source of error due to the unknown surface of the card being read. Various optical systems have been employed for reading card numbers or other pertinent data on a credit card. However, these systems suffer from internal reflections, etc., and, therefore, have been found to be rather ineffective.

There have been a number of recent attempts to record binary type data on credit cards with magnetic inks for enabling a magnetic reading of the credit card. However, these attempts, to date, have not proved successful since normal wear and tear to which a card is subjected, often results in abrasion or obliteration of pertinent binary bit information. Furthermore, the present attempts to read such information have not obviated the problem of destruction of the recorded data by exposure to external magnetic fields and the like.

OBJECTS

It is, therefore, the primary object of the present invention to provide a credit card with indicia imprinted thereon in such manner that it is capable of withstanding the abuse to which credit cards are normally subjected.

It is another object of the present invention to provide credit cards of the type stated with indicia imprinted thereon, which cards can be conveniently read by magnetic indicia reading devices.

It is a further object of the present invention to provide a system for accurately recording the indicia on credit cards of the type stated.

It is an additional object of the present invention to provide a system for reading the indicia imprinted on the credit cards of the type stated.

It is another salient object of the present invention to provide a total system whereby indicia can be printed on a credit card in such fashion that counterfeiting thereof is rendered almost impossible, and where the indicia can be accurately and efficiently read by a magnetic indicia reading device.

With the above and other objects in view, our invention resides in the novel features of form, construction, arrangement, and combination of parts presently described and pointed out in the claims.

DRAWINGS

In the accompanying drawings (6 sheets):

FIG. 4 is a vertical sectional view taken along line 4—4 of FIGURE 3;

FIG. 5 is a schematic side elevational view of a reading head formed in accordance with and embodying the present invention and forming part of the credit card reader of FIG. 2.

FIG. 6 is a schematic side elevational view of a modified form of reading head constructed in accordance with and embodying the present invention and forming part of the credit card reader of FIG. 2;

FIG. 7 is a schematic side elevational view of another modified form of reading head constructed in accordance with and embodying the present invention and forming part of the credit card reader of FIG. 2;

FIG. 8 is a schematic side elevational view of a further modified form of reading head constructed in accordance with and embodying the present invention and forming part of the credit card reader of FIG. 2;

Figure 13:
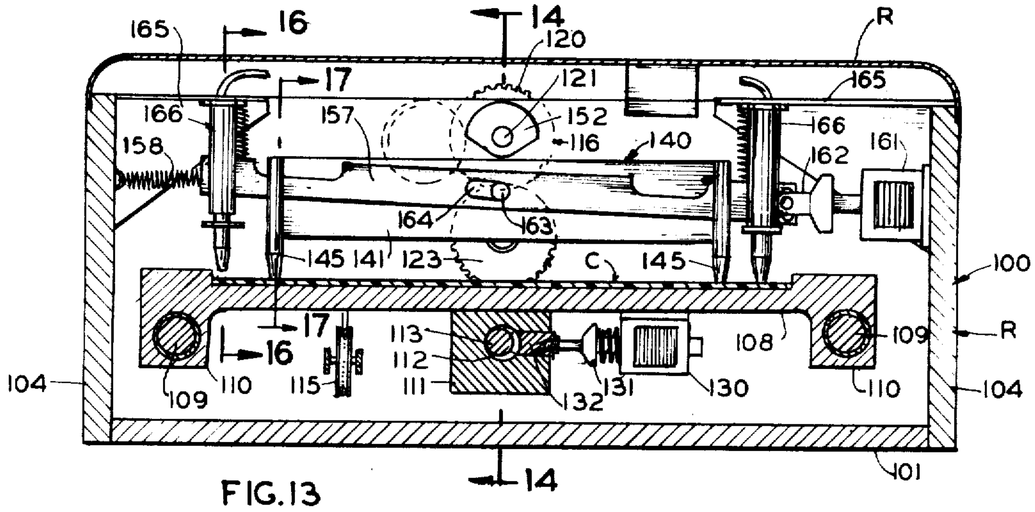
FIG. 13 is a front elevational view in section of an indicia recording mechanism constructed in accordance with and embodying the present invention.
Figures 14, 15, 16, 17:
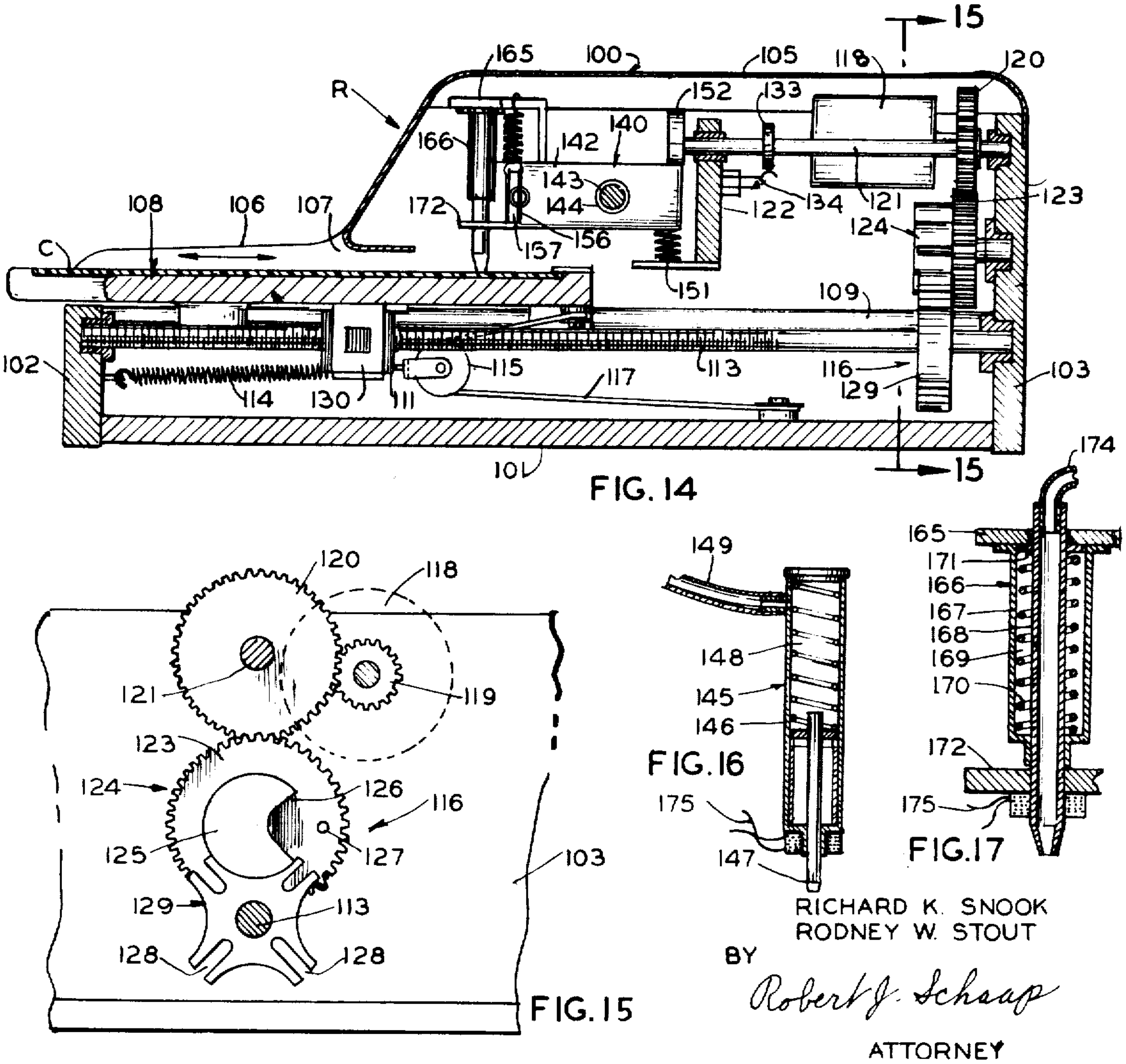
FIG. 14 is a vertical sectional view taken along line 14—14 of FIG. 13.
FIG. 15 is a fragmentary vertical sectional view taken along line 15—15 of FIG. 14.
Figure 18:
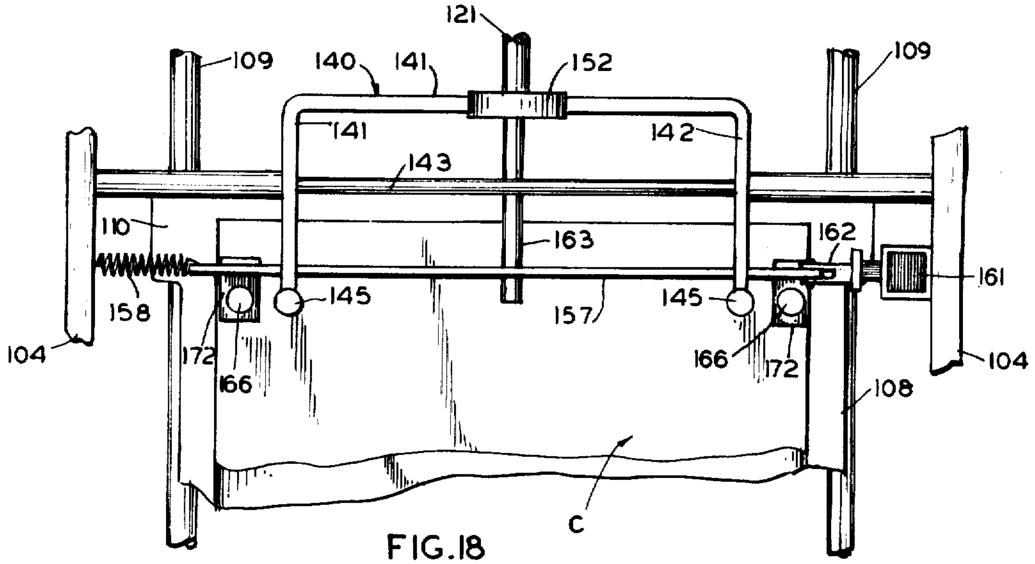
Figure 20:
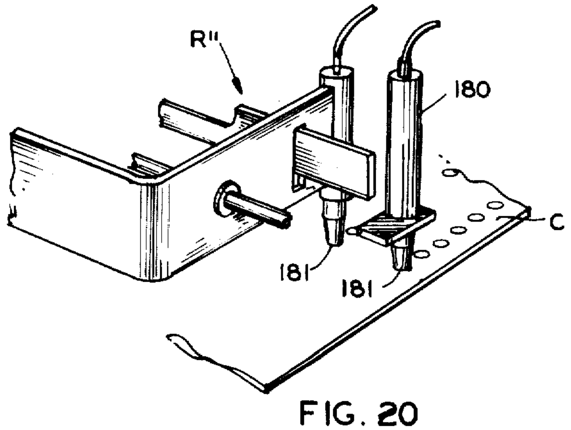
Figure 19:
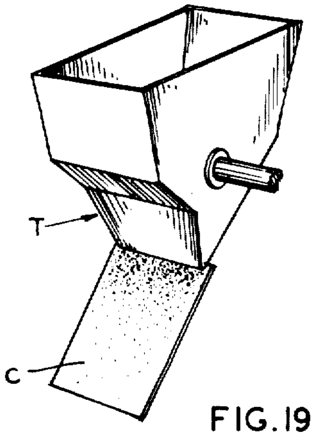
Figure 21:
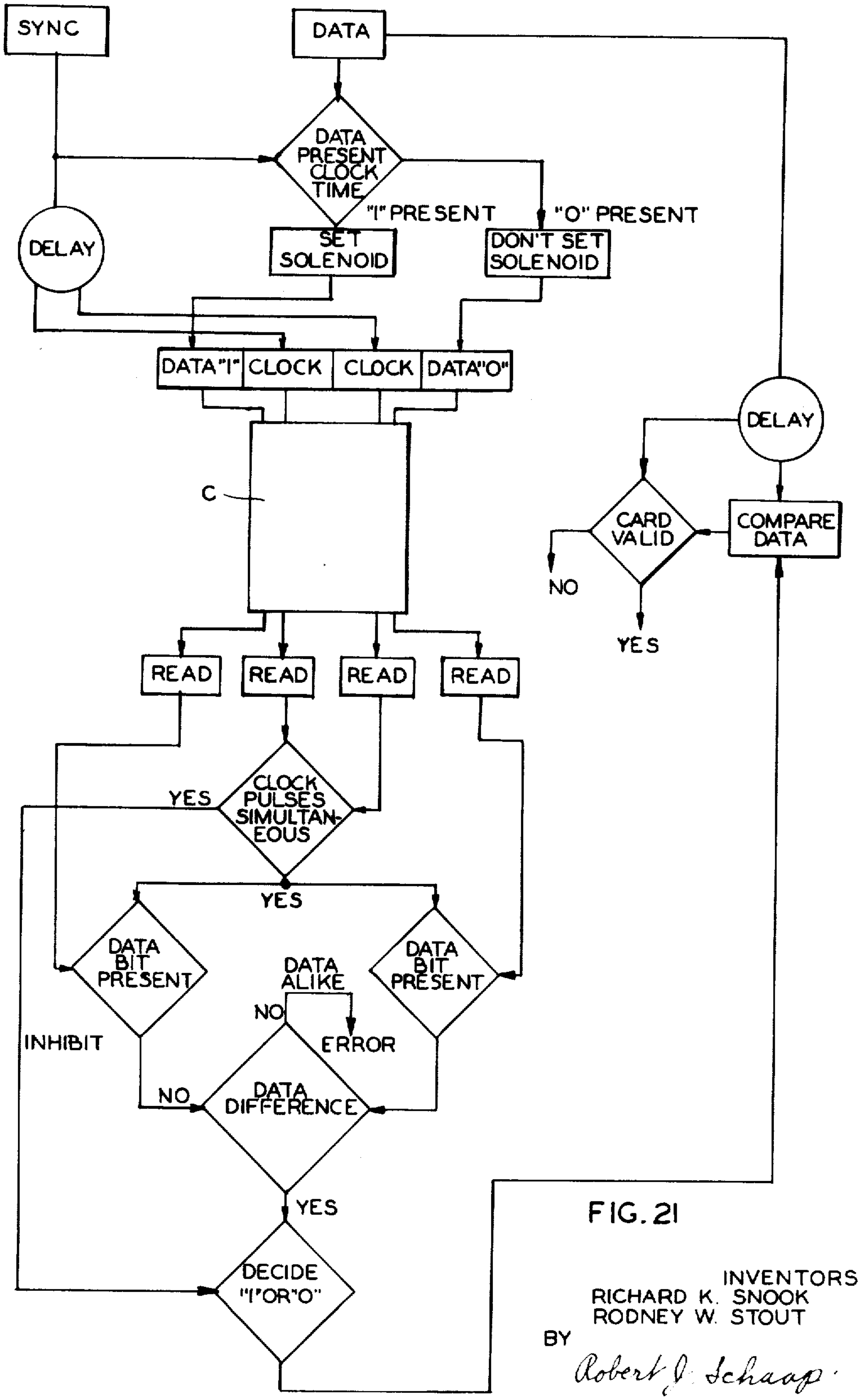

FIGS. 16 and 17 are fragmentary vertical sectional views taken along lines 16—16 and 17—17 respectively, of FIG. 13, wherein FIG. 16 illustrates a clock pulse marking head and FIG. 17 illustrates a data pulse marking head;

FIG. 18 is a horizontal sectional view looking down upon the upper portion of the mechanism illustrated in FIG. 13;

FIG. 19 is a perspective view of an ink cascading mechanism forming part of a modified form of indicia recording system constructed in accordance with and embodying the present invention;

FIG. 20 is a perspective view of a modified form of indicia recording system constructed in accordance with and embodying the present invention; and FIG. 21 is a schematic view illustrating the process of recording on a credit card, reading the information thereon and rendering a comparison of the same.

GENERAL DESCRIPTION

Generally speaking, the present invention provides a credit card or similar information bearing device having binary type data imprinted thereon with a ferromagnetic material. A first data track has recorded thereon binary type data which may correspond to the decimal digit credit card number appearing on the face of the credit card. A first clock track has clock pulses imprinted thereon which correspond to each datum position in the first data track. Spaced from the first data track and first clock track are a second data track and a second clock track which have similar type data imprinted thereon. However, the information in the second data track is the exact complement of the information in the first data track.

As an embodiment of the present invention, it is possible to add further redundancy to the information on the credit card by imprinting the data appearing in the first and second tracks in the same form one or more times. The data tracks are preferably located in a position where normal abrasion effects will not tend to obliterate or destroy any of the informational data imprinted on the card. In addition, the present invention contemplates the covering of such data with opaque material and/or embedding the magnetic particles beneath the normal surface of the card by thermal means, in order to provide protection for the recorded data as well as to prevent counterfeiting of the credit card.

The present invention also provides a credit card reader which is capable of reading the indicia imprinted on or embedded in the card. The card reader includes a mechanism for receiving the credit card and introducing the same to a location where magnetic type reading heads are automatically brought into contact with the recorded data. The magnetic type reading heads will simultaneously read both data tracks and both clock tracks. A reading circuit which forms part of the credit card reader will compare the datum on the first track with its complement appearing on the second track in synchronizing pulse time by also reading the clock pulses on each of the clock tracks. The circuit is designed to introduce a delay time factor in reading the data from each of the data tracks in order to determine the temporal relationship of the data, and to obviate any problems of the card being skewed during the reading process. The output of this reading system is designed to be introduced into credit card verifiers of the type which electronically compare stored binary type data with the binary type data appearing on the credit card. Such credit card verifier apparatus is exemplified in U.S. Letters Pat. application Ser. No. 692,975, filed Dec. 22, 1967 for a Credit Card Verifier apparatus and now U.S. Pat. No. 3,601,805.

As an optional addition to the circuit of the present invention, it is contemplated that an error detection circuit may be added for providing indication of an improper card.

The present invention also provides a recording mechanism for magnetically recording binary type data representative of a credit card number on the credit card. This apparatus is designed to imprint a synchronizing pulse on each of the clock tracks at each position. The imprinting of the data and synchronizing pulses on the clock tracks is performed in timed relationship to the movement of the card through the printed device. In addition, a pair of printing heads are located to be actuated when data pulses are to be recorded in each of the data tracks. Since one data track serves as the complement of the other, the two data recording members will be operated in complementary fashion.

DEFINITIONS

The recent advances in the field of cybernetics and more particularly in the field of data processing have created a condition of multiple uses of terms which has led to some confusion. In view of the fact that there is no accurate standardization of terms, the following definitions are set forth for purposes of clarity. It should be recognized that these definitions are only exemplary and, therefore, non-limiting.

As used herein:

Character — a conventional or non-conventional mark, symbol, number or digit such as a decimal digit or letter of the alphabet or similar indicia.

Word — one or more characters such as a group of decimal digits to form a number, as for example, ten decimal digits may represent one word, or a group of bits required to portray the same decimal number.

Bit — A contraction of a binary digit or a binary decimal or binary coded decimal or similar digital element which may be generated through conversion of a character to another type of character system or language; as for example, four bits generated from a decimal digit, so that the radix of the numerical system is reduced to two.

Byte — the smallest group of binary digits required to represent a single decimal integer, as for example, four bits are used to represent a single decimal integer in binary coded decimal coding and these four bits constitutes one byte.

Set — the number of bits required to represent one or more characters as for example, the four bits generated to represent one decimal digit would constitute a set.

Reading — the process of discerning and acquiring data from a member (the term "reading" is generally applied to digital arts and the term "reproducing" is generally applied in analog arts, but have synonomous meanings herein).

Recording — the process of registering data in some temporary, permanent or semi-permanent form (the term "recording" is generally applied in analog arts and the term "writing" is generally applied in digital arts, but have synonomous meanings herein).

The remaining terms used herein are deemed to have their commonly accepted art recognized meanings.

DETAILED DESCRIPTION

Credit Card

Referring now in more detail and by reference characters to the drawings which illustrate the practical embodiments of the present invention, C designates a credit card generally comprising a plastic sheet 1 which has been stamped, die cut, and finished in accordance with normal credit card manufacture procedures. The credit card 1 generally includes a block 2 having a special slightly serrated surface in order for the credit card holder to inscribe his name.

The credit card may generally include other data 3, which is normally imprinted thereon representative of the credit card issuer, etc. Furthermore, the credit card may have embossed thereon a typical credit card account number 4, typically in decimal digit form or alpha-numeric form.

Figures 1, 2, 3:
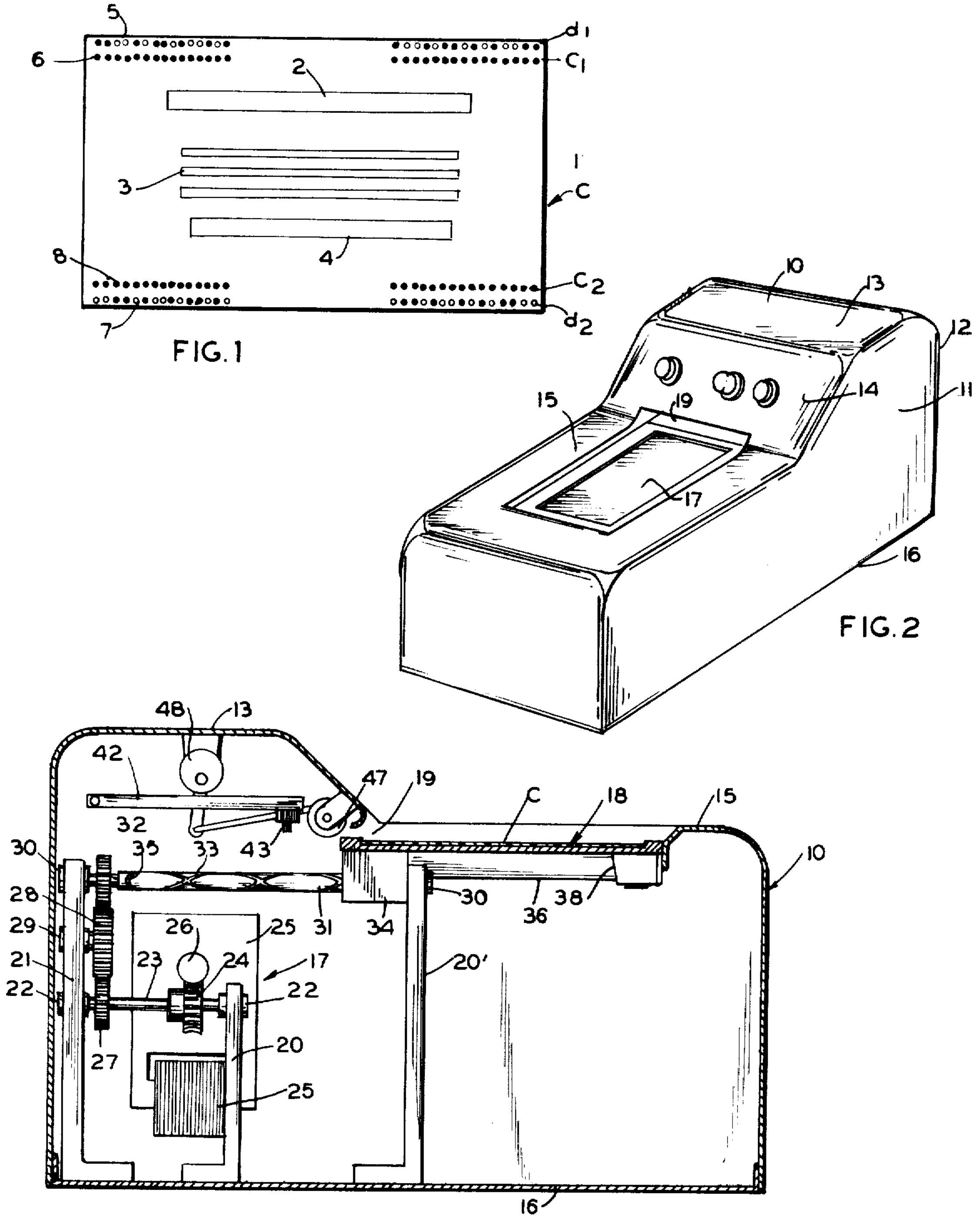
FIG. 1 is a schematic top plan view of a credit card having indicia imprinted thereon in accordance with the present invention.
FIG. 2 is a perspective view of a credit card reader constructed in accordance and embodying the present invention.
FIG. 3 is a vertical sectional view taken along line 3—3 of FIG. 2.

Imprinted along the upper and lower longitudinal margins of the credit card 1 are a pair of data tracks $d_1$ and $d_2$. Spaced inwardly from each of the data tracks $d_1$, $d_2$ are a pair of clock tracks $c_1$, $c_2$, as indicated more fully in FIG. 1. The data track $d_1$ has recorded thereon in binary coded decimal form (BCD form) a first set of data 5, which represents the credit card number 4. As illustrated in FIG. 1, the solid color dots are used to designate a "true" bit or the binary character "1" and the small circular dots are used to represent a "false" bit or the binary character "O". Four of these bits form one byte which may be BCD coded to represent a single integer in the decimal system or six of these bits for an alpha-numeric code such as ASCII. In essence, only the dots represent binary ones by means of the change of ferromagnetic permiance. Thus, just the binary ones are magnetically recognizable, and any exposure to a magnetic field, regardless of its strength or orientation can only magnetize the binary ones to saturation and cannot effect the binary zeros since they are magnetically transparent. While magnetization of the binary ones is not necessary, any such magnetization will increase the amplitude of the signal produced by the binary one in the reading process. It should also be recognized that the entire credit card number 4 has not been represented in BCD form in the interest of space. Furthermore, it should be recognized that the data 5 appearing in the data track does not have to correspond to the credit card number 4, the data 5 could be representative of another coded number known only to the credit card issuer.

In like manner, it is possible to use error detecting codes, such as the reflected binary code or so-called "-Gray Code." Other more elaborate codes may also be employed, such as codes which use extra bits to detect error conditions. Essentially, any type of binary code could be used to record the indicia 5 in the data column $d_1$. The major criterion for employment of any code is that each bit representing a character or a portion of a character is located in positional relationship with synchronizing bits in the clock track $c_1$. In order to illustrate the convenient interchangeability of codes which can be used for printing the characters on the credit cards of the present invention, a portion of the binary decimal code, and the reflected binary code together with their decimal equivalent have been set forth below:

| Decimal | Binary Coded Decimal | Reflected Binary |
|---|---|---|
| 0 | 00000 | 00000 |
| 1 | 00001 | 00001 |
| 2 | 00010 | 00011 |
| 3 | 00011 | 00010 |
| 4 | 00100 | 00110 |
| 5 | 00101 | 00111 |
| 6 | 00110 | 00101 |
| 7 | 00111 | 00100 |
| 8 | 01000 | 01100 |
| 9 | 01001 | 01101 |

The clock track $c_1$ also has imprinted thereon a series of sync pulses 6, one for each data position, whether "1" or "0" on the data track $d_1$.

The data track $d_2$ also has recorded thereon in binary form, a set of data bits which are the complete complement of the set of data bits 5 appearing on the data track $d_1$. By further reference to FIG. 1, it can be seen that where a "1" exists on the data track $d_1$, a "0" will exist on the data track $d_2$. In like manner, where a "0" exists on the data track $d_1$ a "1" will exist on the data track $d_2$. Furthermore, clock track $c_2$ has a series of clock pulses 8 which correspond to each datum in the data track $d_2$ whether the data is "1" or "0". Inasmuch as the data and the attendant clock pulses appearing on the tracks $d_1$, $d_2$, $c_1$, $c_2$ will occupy a small area, it is possible to re-record this information one or more times as indicated on the right hand upper and lower margins of the credit card c appearing in FIG. 1. This additional recording will provide yet additional redundancy in order to detect errors or invalid cards. However, it has been found in connection with the present invention that the redundancy achieved by the two sets of data bits 5, 7 and the two sets of clock pulses 6, 8 provides more than sufficient redundancy in order to detect error conditions or invalid cards.

It should be noted that the same redundancy inherent in the multiple track system could be achieved through repetition of the data in a single track. A pair of reading heads is employed for each combination of a clock track and a data track, and accordingly, four reading heads are employed for the tracks $d_1$, $d_2$, $c_1$, $c_2$ in a manner hereinafter described in detail. However, this system would require an arrangement of the reading heads to read the same edge of the card but with one pair of reading heads advanced one-half the length of the card with respect to the other pair of reading heads.

For the purposes of the present invention, the credit card c has been described as having a digital character represented by four bits of a binary coded decimal system. In this system each decimal digit is represented by the group of four binary digits and usually refers to the four position binary decimal code 0000 to 1001 (decimal 1 to 9). Accordingly, each decimal digit on the account number would be represented by one byte of four binary bits. Each word of characters would be represented by a number of bits (four for each character) in serial fashion.

The data pulses and the sync pulses are recorded on the various data and clock tracks with ferromagnetic material in a manner to be more fully hereinafter described. Various types of ferromagnetic material which can be used in the present invention are also set forth below. However, for the purposes of the present invention, it is immaterial if the ferromagentic material is magnetized or is not magnetized.

It should be noted that by recording the information in the set of bits 5 and its complement 7, a convenient form of redundancy has been achieved. Accordingly, it is exceedingly difficult for someone to attempt the counterfeiting of this type of card. Furthermore, the credit card of the present invention is not limited to data recorded along the longitudinal margins as appearing in FIG. 1, and it should be recognized that this type of data could be located anywhere on the surface of the card. Furthermore, the present invention contemplates the covering of this data with nonmagnetic materials such as an epoxy resin or suitably painting or imprinting over the same with other nonmagnetic materials. This covering will not only protect the data recorded on the card but will provide an additional measure to prevent counterfeiting of the card as well.

Indicia Reading Apparatus

The credit card reader A forming part of the system of the present invention is more fully illustrated in FIGS. 2–6 and generally comprises an outer housing 10 having a pair of opposed side walls 11, and a back wall 12, and a relatively short top wall section 13. The top wall section 13 integrally merges into a relatively short vertical wall 14, which is in turn formed with a relatively flat horizontal front wall 15, in the manner as illustrated in FIG. 2. The housing 10 is secured to a base plate 16 in the manner as illustrated in FIG. 3, by any conventional fasteners, such as screws. The housing 10 may be provided with hinged elements or removable elements (not shown) in order to provide access to the interior thereof. Furthermore, the horizontal wall 15 is cut away to accommodate a card retaining tray 18 forming part of a card moving mechanism 17. The vertical wall 14 is cut away in the provision of an intake aperture 19.

Rigidly mounted on the base plate 16 by means of conventional fasteners, such as screws, are a pair of spaced opposed forward and rearward L-shaped brackets 20, 21. The brackets 20 and 21 are apertured to accommodate conventional ball bearings 22. Journaled in the bearings 22 and extending between the brackets 20, 21 is a worm shaft 23 which carries a worm gear 24. A conventional A.C. electric motor 25 is also mounted on the bracket 20 and may be provided with a cord set (not shown) for connection to a suitable source of electrical current (also not shown). The motor 25 drives a worm 26 for rotation of the worm shaft 23.

Mounted on the rearward end of the worm shaft 23 is a spur gear 27 which meshes with an idler gear 28, the latter also being journaled in the bracket 21 through a conventional ball bearing 29. The brackets 20 and a matching bracket 20' are also apertured to accommodate a pair of spaced opposed ball bearings 30 for accommodating a main drive shaft 31. By reference to FIGS. 3 and 4, it can be seen that the drive shaft 31 is located in upwardly spaced relation to the worm shaft 23. Mounted on the rearward end of the drive shaft 31 is a drive gear 32 which meshes with the idler gear 28 causing rotation of the drive shaft 31 upon energization of the motor 25.

The main drive shaft 31 is provided with a pair of opposed spiral grooves 33 for the greater portion of its length for causing reciprocative movement of a drive block 34. The drive block 34 is provided with an internal pin or follower 35 which extends into the grooves 33 and causes the block 34 to shift back and forth, reciprocatively, along the shaft 31 as the shaft 31 rotates. The shaft 31 is provided at the ends of the spiral grooves 33 with a pair of circular end grooves 35 for reversing the direction of movement of the drive block 34.

Mounted on the upper ends of the bracket 21 and a matching bracket 20' spaced forwardly of the bracket 20, are a pair of transversely spaced opposed rails 36 for supporting the card retaining tray 18. The retaining tray 18 is provided with four depending rollers 37 which ride on the rails 36 enabling movement of the tray 18. The rollers 37 are secured to depending flanges 38 formed along each of the longitudinal margins of the tray 18 by means of supporting pins 39. By further reference to FIG. 4, it can be seen that the underside of the tray 18 is secured to the drive block 34 so that the tray 18 will be reciprocatively driven with the drive block 34.

The rollers 37 have enlarged peripheral flanges 40 which bear against the flat surfaces of the rails 36 for holding the tray 18 in proper alignment. It is also possible to employ three rollers in order to establish a so-called "three-point" carriage, thereby reducing the parallelism required in the rails 36. Furthermore, it would be possible to employ flanged ball bearings on spring loaded shafts for the same purpose. In addition, a pair of laterally struck flat spring shoes 41 are secured to the underside of the tray 18 and bear against the underside of each of the rails 36 for holding the tray 18 against the rails 36.

By further reference to FIG. 3, it can be seen that the retaining tray 18 extends through the intake aperture 19. When a card c is placed on the tray 18 and the motor 25 is energized, the drive shaft 31 will rotate causing the drive block 34 to shift rearwardly and then forwardly in a complete cycle. This driving action is accomplished through the gearing mechanism previously described. As the drive block 34 is shifted, the tray 18 will also be shifted therewith.

Mounted on a transversely extending pivotal cross bar 42 at one transverse end thereof are a pair of reading heads 43, 44 which are located in alignment with the data track $d_1$ and the clock track $c_1$, respectively. Mounted on the other end of the cross bar 42 are a pair of reading heads 45, 46 which are aligned with the data track $d_2$ and the clock track $c_2$, respectively. The reading heads 43, 45 are designed to read the data in the data tracks $d_1$ and $d_2$ and are referred to as data heads. In like manner, the reading heads 44, 46 are designed to read the clock data on the tracks $c_1$ and $c_2$ and are referred to as the clock heads or sync heads.

Also mounted in the housing 10 is a sensing roller 47 which is capable of sensing the presence of a credit card. As the credit card *c* which is located on the tray 18 enters the housing 10, the sensing roller 47 will encounter the forwardly presented margin thereof and will be biased upwardly by the credit card *c*. As this occurs, a camming arrangement 48, which is connected to the sensing roller 47 and to the pivotal bar 42 will urge the bar downwardly into the "reading position." As the tray 18 carrying the credit card c thereon is located beneath the various heads 43–46, these heads will read the magnetically recorded indicia imprinted on each of the tracks $d_1$, $c_1$, $d_2$, $c_2$, respectively. Furthermore, actuation of the main drive shaft 31, will enable the drive block 34 to return to its initial position. The pivotal cross bar 42 will be biased upwardly enabling the tray 18 to return to its initial position, thereby carrying the card c to the initial loading position.

Each of the reading heads 43–46 is substantially identical in its construction and each is uniquely designed for use in reading the indicia of the present invention. One of these reading heads 43 is illustrated and described in more detail in FIG. 5, all of the other reading heads 44–46 being substantially identical in construction. The reading head 43 generally comprises a pair of pole pieces 49 with a pair of ends separated by an air gap 50. The pole pieces 49 are formed of a ferromagnetic material such as iron, or Ferrite, etc. A small block or spacer 51 preferably formed of a paramagnetic material is located in the gap 50 between the two ends of the legs 49. A permanent bar magnetic 52 is disposed across the other ends of the pole pieces 49 in the manner as illustrated in FIG. 5. A coil 53 is wound around and substantially encompasses the two legs 49 of the pole piece 48 so that the data head 43 essentially serves as a form of variable reluctance transducer. Accordingly, the voltage output across a resistor 54, as illustrated in FIG. 5, is a function of the flux density of the gap which, in turn, is a function of the permeability of the material adjacent to the gap such as the bits recorded on the card *c*.

It is also possible to provide a modified form of reading head which is illustrated in FIG. 6 and generally comprises an outer housing 55 having a central metallic core 56, which is secured to an upper bar magnet 57. An L-shaped ferromagnetic flux member 58 has a short leg 59 which terminates immediately beneath the central core 56. A coil 60 is wound about the central core 56 in the manner as illustrated in FIG. 6. The reading head illustrated in FIG. 6 also serves as a variable reluctance device. Typically, when reading data of the type imprinted on bank checks, etc., it is desirable to employ reading heads which render a high degree of resolution since the printed matter inherently has very narrow lines and small changes of line width. However, it has been found in connection with the present invention that variable reluctance devices which have low resolving power very effectively read the digital data imprinted on credit cards. The use of a variable reluctance device for reading this type of data presents a rather surprising result inasmuch as it is possible to obtain a relatively noise free output signal.

It should be observed that the reading system of the present invention enables the preparation of a credit card with magnetic digital data imprinted thereon. The prior attempts to read digital data from indicia bearing elements such as credit cards resided in attempts to imprint the element with magnetic indicia. Generally, a reading head having coils was passed over the magnetic indicia. The reading heads have pole pieces provided with coils and an "air gap" between the faces of the pole pieces. The flux field in the pole pieces is increased by passing the air gap over a magnetized particle. Hence, a voltage is induced in the coils surrounding the pole pieces.

The digital data imprinted on the indicia bearing element of the present invention is not stored in the form of a magnetic field. Hence, the information recorded on credit cards in accordance with the present invention is not easily altered or erased. The permanent magnet across one end of the poles biases the magnetic structure. The gap between the opposite poles of head assembly is filled with a paramagnetic material. When this material is bridged with a ferromagnetic material, i.e., the material forming the indicia, the reluctance of the circuit is decreased due to the fact that the permeability of the ferromagnetic material is higher than air. Since the reluctance of the circuit is decreased, the flux density in the core structure is increased, resulting in the induction of a voltage.

It is also possible to provide another modified form of reading head which is illustrated in FIG. 7 and which generally comprises a pair of pole pieces 61 with a low MU spacer 62 located in the gap between one pair of opposed ends of the pole pieces 61. One of the pole pieces 61 has a coil 63 wound thereon and is connected to a conventional device *s* capable of producing a sine wave excitation signal. An output coil 64 is wound on the other of the pole pieces 61 and is connected to an amplifier-detector 65 which is in turn connected to a conventional Schmidt trigger 65'.

In the reading head illustrated in FIG. 7, the permeability of the material bridging the gap area between the ends of the pole pieces 61, will determine the flux density of the magnetic circuit for a given drive level. Thus, the permeability of the material in the gap area will determine the amount of energy coupled to the output winding or coil 64. The amplifier-detector 65 includes an integrator (low pass filter section) so that the output of the amplifier-detector 65 will be in the form of a D.C. voltage proportional to the permeability of the material near the gap 62. This D.C. signal is transformed to the logic voltage levels used in the reading circuits B or B' more fully described hereinafter, so that the presence of a high permeability material near the gap 62 will cause the "1" level output. Conversely, a low permeability will give rise to the "0" level.

It is also possible to provide a further modified form of reading head which is illustrated in FIG. 8 and which generally comprises a pair of pole pieces 66 with a low permeance plug 67 located in the gap between one pair of opposed ends of the pole pieces 66. One of the pole pieces 66 has a coil 68 wound thereon, and is connected to a conventional device $s'$ capable of producing a sine wave excitation signal. A Hall effect device 69 biased by battery Z is located in the gap between the opposite opposed ends of the pole pieces 66, the Hall effect device 69 being a conventional semi-conductor device for measuring magnetic field strength.

The remainder of the operation of the reading head illustrated in FIG. 8 is similar to that illustrated in FIG. 7. In the reading head illustrated in FIG. 8, the magnetic flux is a function of the permeability of the material in the gap area. Thus, the permeability of the material in the gap area will effect the output of the Hall effect device and hence the signal transmitted to the reading circuits B or B′ described hereinafter. If the presence of a data bit is detected (a high permeability material) a "1" level output is produced. In like manner, detection of no data bit present (low permeability material) will give rise to the production of a "0" level output.

Figure 9:
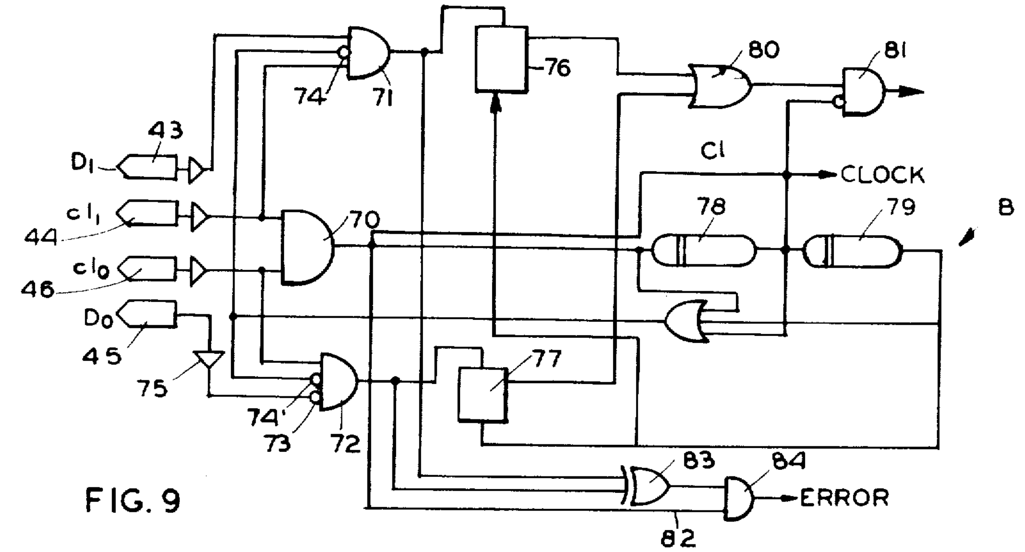
FIG. 9 is a schematic view illustrating the circuitry forming part of the credit card reader of the present invention.

The reading circuit B which forms part of the card reader of the present invention is more fully illustrated in FIG. 9. The components of the reading circuit can be conveniently assembled on a printed circuit card and mounted interiorly of the housing 10. The reading circuit generally includes an AND gate 70 which is connected to the two sync reading heads 44, 46. The circuit also includes a pair of AND gates 71, 72 which are respectively connected to the data reading heads 43, 45 in the manner as illustrated in FIG. 9. An inventor 73 is provided on the input to the AND gate 72 from the data head 45 in order to invert the data introduced into the AND gate 72. Thus, through this inversion, the data introduced into the AND gate 72 is the complement of the data introduced into the AND gate 71.

The inputs from the sync heads 44, 46 to the AND gate 70 are also connected to the gates 71, 72 for introducing the synchronizing pulses to each of the gates 71, 72. Furthermore, the clock pulses introduced into the gates 71, 72 are inverted by means of inverters 74, 74′, respectively. Conversion amplifiers 75 are connected to the outputs of the heads 43–46 in order to amplify the signal detected by the heads 43–46.

The output of each of the gates 71, 72 is connected to the "S" or set terminal of a pair of flip-flops 76, 77 in the manner as illustrated in FIG. 9. The flip-flops 76, 77 are preferably of the D type. The flip-flops 76, 77 coact in such manner that they serve as a two-bit storage resister, where the data is introduced in the read form in the flip-flop 76 and in the complementary form in the flip-flop 77. The output of the AND gate 70 is connected to a one-shot 78 or similar time delay element and the output of the one-shot 78 is connected to a second one-shot 79, or similar time delay element. The output of the one-shot 79 is, in turn, connected to the reset or "R" position of the flip-flops 76, 77 in the manner as illustrated in FIG. 9. In like manner, the output of the one-shot 79 is, in turn, connected to the inhibits 74 on the AND gates 71, 72, respectively.

The true "Q" position of the flip-flop 76 is connected to one input terminal of an OR gate 80 and the "Q" position of the flip flop 77 is connected to the other input terminal of the OR gate 80. The output of the OR gate 80 is connected to one input or an AND gate 81 and the other input of the AND gate 81 is connected to the common connection between the one-shots 78, 79 in the manner as illustrated, in FIG. 9. The output of the AND gate 81 is connected to any suitable credit card verifier of the type described hereinabove or to any other source which is capable of analyzing or recording the digital data output from the AND gate 81.

The flip-flop 76 will always initially be in the "zero" state or reset state and the lower flip-flop 77 will also always initially be in the reset state. The sync pulse heads 44, 46 will read the sync pulses on each of the clock tracks $c_1$, $c_2$ and will transmit a pulse for each bit position to the AND gate 70. Accordingly, the AND gate 70 will always receive a sync pulse from each of the heads 44, 46 during the reading process. In like manner, the data heads 43, 45 will either read a "1" or a "0" for each sync pulse. When the data head 43 reads a "1," the data head 45 will read a "0."

Figure 11:
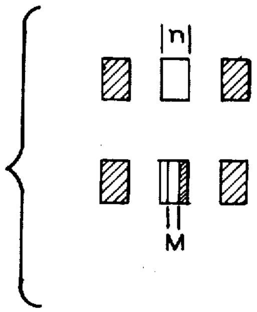
FIG. 11 is a schematic illustration showing the position of the two sets of data bits when the card is perfectly aligned with respect to the reading head.

It can be seen that the data pulses will be read only at sync pulse time. If the credit card c is properly oriented and completely parallel with respect to the various reading heads 43–46, two sync pulses will be read at the same time, and the two sync pulses will be identical. This situation is illustrated in FIG. 11. The width of the clock pulses and data pulses as well as the null time therebetween has been exagerated for purposes of illustration and clarity. However, it can be observed that if the card c is symetrical with respect to the reading heads 43–46, all four tracks of data will be read at the same point in time.

If the credit card c was always properly oriented with respect to the data heads, then the two sync heads 44, 46 will each read a sync pulse simultaneously with a reading of a "038 by one of the data heads 43 or 45 and a reading of a "1" by the other of the data heads 43 or 45. Thereafter, the two AND gates 71, 72 are enabled and the data pulses are transmitted to the flip-flops 76, 77. Accordingly, the OR gate 80 and the AND gate 81 are thereby enabled for transmission of the data, in a manner to be hereinafter described in more detail.

Figure 12:
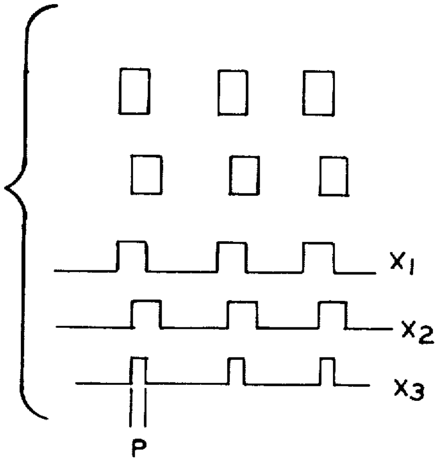
FIG. 12 is a schematic view showing two sets of data bits when the card is skewed with respect to the reading heads.

If the card c is skewed or if the leading edge of the card c is damaged or abraded with respect to guides on the apparatus A, then a situation giving rise to a pulse geometry similar to that illustrated in FIG. 12 may exist. If the card c is skewed, it can be seen that the data pulses and the clock pulses would not be aligned with respect to the various reading heads 43–46. Accordingly, when the data head 43 initially detects the presence of a data pulse, the clock head 44 will not simultaneously detect the presence of a sync pulse. The pulse from the data head 43 is amplified by the amplifier 75 and transmitted to the AND gate 71 which will be enabled at sync pulse time, thereby enabling the data to be transferred to the flip-flop 76. The sync pulse, when read, will pass through the AND gate 70 to the one-shot 78. It should be observed that the AND gate 70 will not be enabled until sync pulses simultaneously appear at both sync pulse heads 44, 46. The one-shot 78 prevents the actual realization of the sync pulses for a predetermined period of time so that the circuit does not read the leading edge of the sync pulse. From external equipment connected to the circuit B a transition from the "false" to the "true" state will be read on the clock output line $c_1$. This external equipment will only recognize data pulses in temporal relation to the clock pulses by recognition of a center slice M in each clock pulse in order to obviate condition of skew.

As illustrated in FIG. 11, the temporal width of the data pulse is represented by "$n$" which is the same as the temporal width of the sync pulse. Furthermore, the width of the null time existing between each of the data pulses and each of the sync pulses is also "n." Each of the data pulses and the clock pulses which have a width M determined by the one-shot exist in a guard band of $n+1/2+1/2n-M$ or a guard band of almost 2n.

As indicated above, the skewed card presents a pulse geometry represented by FIG. 12. Actually, the data pulses will present a wave form as represented by $x_1$ and the sync pulses will present a wave form as represented by $x_2$. The clock pulse generated by the reading circuit can only have a width p which is the portion of the width n of the data pulse which is geometrically coincident with a portion of the width n of the sync pulse. The one-shot 78 would be adjusted to present a slice of reading time M which is also coincident with the generated clock pulse p. For this purpose, the one-shot 78 may be a variable element. However, this would only necessitate an internal adjustment made initially during the calibration and adjustment of the reading apparatus A.

It can be seen that the temporal width of the clock pulse thus generated may vary somewhat depending on the degree of skew of the card c. However, reading of the sync pulse will always vary within the width of this clock pulse. The pair of sync pulses will define a bit position in time. The data pulses would be gated to the flip-flops 76, 77 at the sync pulse time. Since the data in the AND gate 72 is inverted, the outputs of the two AND gates 71 and 72 should be identical. If the output of the AND gate 71 is a "1" the flip-flop 76 would be set and in like manner, the flip-flop 77 is set. Thus, the outputs of the two flip-flops 76, 77 would be transmitted to the OR gate 80.

The one-shot 78 will provide sufficient time to insure the settling of all of the circuit active components. It can be seen that no other information can be introduced into the flip-flops 76, 77 during the period of the guard band 2n associated with each pulse. The data pulse will be held in the flip-flop 76 until the sync pulse has been properly read after the time delay provided by the one-shot 78. If a "1" pulse was properly introduced into the flip-flop 76, then the flip-flop 76 as well as the flip-flop 77 will be set and the data in these two elements will be clocked to the OR gate 80. If a true condition exists at the OR gate 80, the information will be transmitted to the AND gate 81 which is enabled at delayed sync pulse time to further transmit the data therein.

When the card c is moving through the card reader at a fixed rate, there will always be a fixed delay, even when the card is skewed. It should be recognized that the physical relationship of the length that the data on the card occupies i.e., the distance between each of the two pulses is greater than the amount of skew or angular displacement of the card c. When both conditions are satisfied, the OR gate 80 will be enabled, thereby permitting the data to be transmitted through the AND gate 81. It should also be observed that a new clock pulse could not be generated until a reset pulse has been generated for resetting the flip-flops 76, 77, due to the inhibiting action of the second delay 79 which also serves to provide said reset action.

It is possible to optionally provide an error detecting circuit 82 which generally comprises an exclusive OR gate 83 having the two inputs thereof connected to the outputs of the two AND gates 71, 72 respectively, in the manner as illustrated in FIG. 9. The output of the exclusive OR gate 83 and the output of the delay 78 is connected to an AND gate 84. The error detecting circuit is designed to determine if an error occurred in the reading process or if an improper code exists on any of the data tracks *d, gate 2*. The exclusive OR GATE 83 will detect only a "1" and a "0" pulse condition. If both a "0" and a "1" pulse condition existed at the OR gate 83 at sync pulse time, then an error does, in fact, exist. Accordingly, the AND gate 84 is thereby enabled and the output of the AND gate 84 can be connected to a suitable audible or visual warning device (not shown). An error light (not shown) can be optionally mounted on the exterior of the housing 10. Furthermore, a conventional holding circuit (not shown) can also be employed to maintain energization of the error light for a predetermined period of time or until such time as it may be manually reset.

It is also possible to add a parity circuit to the reading circuit B of FIG. 9 where the generation of a parity bit can be tested over the entire set of data for an even or odd sum. This odd or even number of bits generated can be examined to determine if any bits were gained or lost during the reading process.

It is also possible to provide a reading circuit B' (FIG. 10) which forms part of the reading apparatus A for reading only one clock track and one data track. In many applications, the redundancy achieved by the two data tracks $d_1$ and $d_2$ along with the two attendant clock tracks $c_1$ and $_2$ is not necessary. Accordingly, a credit card *c* can be prepared with only one clock track and one data track. The reading apparatus A would thus use the circuit B' of FIG. 10 as opposed to the circuit B of FIG. 9. It should be obvious that the circuit B of FIG. 10 could be employed with the card having four such tracks; with the exception that one of the data tracks and one of the clock tracks would not be functional in the reading process.

The circuit B' generally comprises a sync pulse head 85 and a data head 86, for reading a clock track $c_1$ and a data track $d_1$, respectively. Conventional amplifiers 87, 87' are connected to the outputs of the heads 85, 86 for amplifying the signals detected by the heads 85, 86 and providing a voltage level and impedance match for the following circuitry. The outputs of the amplifiers 87, 87' are connected to two inputs of an AND gate 88, the output of which is connected to the set position or a flip-flop 89. The output of the amplifier 87 is connected to a one-shot 90 which is, in turn, connected to a second one-shot 91. The output of the one-shot 91 is connected to the reset position of the flip-flop 89. The common connection of the two one-shots 91, 92 are connected to one input of an AND gate 93, the other input of which is connected to the "Q" position of the flip-flop 90. The output 94 of the AND gate 93 can be suitably connected to any desired apparatus to receive the read information as in the case of the output of the amplifier 81. In like manner, a clock pulse terminal 95 can be provided for transmitting the sync pulses along with the data pulses.

Figure 10:
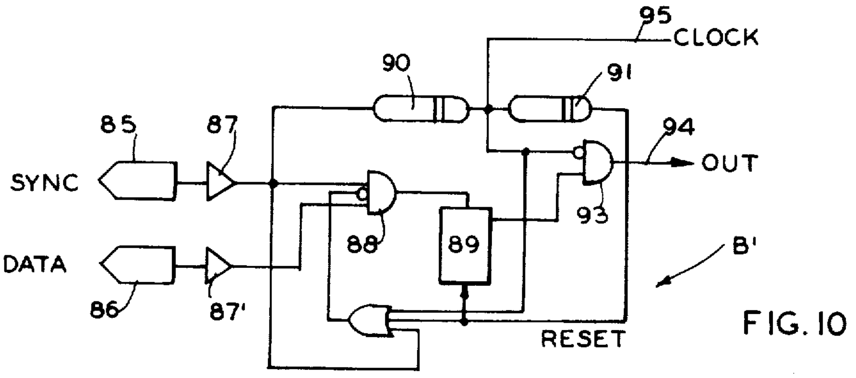
FIG. 10 is a schematic view illustrating a modified form of circuitry forming part of the credit card reader of the present invention.

As in the case of the reading circuit B of FIG. 9, the reading circuit B' of FIG. 10 is only conditioned for reading the data from the data head 86 at sync pulse time. If the data head 86 reads a "1" pulse on the data track $d_1$ at sync pulse time, then the flip-flop 89 which serves as a 1 bit storage register will be placed in the set condition. The one-shot 91 will insure that all of the circuit active components have had sufficient settling time. The pulse will be held in the flip-flop 89 until the sync pulse has been properly read after the time delay provided by the one-shot 91. If a "1" pulse was properly introduced into the flip-flop 89, then flip-flop 90 is set and the data therein is clocked to the AND gate 94. After the time delay provided by the one-shot 92, which is shorter than the time delay provided by the one-shot 91, the flip-flop 89 is reset to receive another pulse. It is also possible to add a parity circuit to the reading circuit B' illustrated in FIG. 10.

Indicia Recording Apparatus

The present invention also provides a recording system which includes a recording apparatus R for printing the indicia on the credit card c and which apparatus is more fully illustrated in FIGS. 13–20. The apparatus R generally comprises an outer housing 100 having a base plate 101, a front wall 102, a back wall 103, a pair of side walls 104 and a top wall 105. An intermediate horizontal wall 106 extends between the front wall 102 and the top wall 105 and is provided with an intake aperture 107. A card retaining tray 108 is shiftable to a forwardmost position, or socalled "loading position," as illustrated in FIG. 14 where it is capable of receiving a blank credit card stock. The retaining tray is shiftable rearwardly in the housing 100 to a recording position where indicia are recorded on the credit card stock in a manner to be hereinafter described in more detail.

It should be observed that the recording apparatus R as described and illustrated herein is capable of recording indicia on the credit card stock on an intermittent basis. However, it should be recognized that the apparatus of the present invention could be constructed in such fashion to record indicia on a credit card on a continuous basis. Furthermore, the recording apparatus of the present invention could be interfaced to an embossing machine for recording the indicia thereon in conjunction with the embossing of information on the credit card. In like manner, the recording apparatus of the present invention could be connected to digital computing equipment for controlling the operation of the recording apparatus.

The card retaining tray 108 is shiftable in the housing 100 from the loading position to the recording position on a pair of longitudinally spaced guide rods 109 which are secured to the front wall 102 and the back wall 103 in the manner as illustrated in FIGS. 13 and 14. The tray 108 is provided with a pair of depending blocks 110 which concentrically engage the guide rods 109. The tray 108 is provided on its underside with a depending lug 111 having an internally threaded aperture 112 which is engagable with and shiftable by a jack screw 113 having an externally threaded surface. The card retaining tray 108 is normally biased to the loading position by means of a return spring 114 which is connected to a pulley 115 and the front wall 102 and is moved to the recording position by means of a drive unit 116. A cable 117 is trained around the pulley 115 and is secured to the tray 108 and the base plate 101 in the manner as illustrated in FIG. 14. By means of this construction, the return spring 114 does not stretch for the distance that the tray 108 is moved. The cable 117 and pulley 115 will allow for considerable movement of the tray 108, without causing undue stretching of the return spring 114.

The drive unit which is more fully illustrated in FIGS. 14 and 15 generally comprises an electric motor 118 which powers a drive gear 119. The drive gear 119 meshes with a pinion gear 120 mounted on a cam shift 121, the latter being journaled in the back wall 103 and an upstanding bracket 122 located internally in the housing 100. The pinion gear 120 also meshed with a second pinion gear 123 journaled in the back wall 103 and which forms part of a geneva mechanism 124. Secured to the pinion gear 123 is a guide roller 125 having an arcuately shaped recess 126 and an outwardly extending geneva pin 127. The pin 127 operatively engages four circumferentially spaced grooves 128 on a star wheel 129 forming part of the geneva mechanism 124. The star wheel 129 is rigidly secured to the jack shaft 113 in the manner as illustrated in FIG. 15.

Rotation of the pinion gear 120 will cause rotation of the pinion gear 123 and the guide roller 125, as well as the geneva pin 127. As the pin 127 engages an elongated slot 128, it will rotate the star wheel 129 and the jack screw 113 through successive incremental 90° rotations. The actual construction of the geneva mechanism 124 and its operation is conventional and is therefore neither illustrated nor described in any further detail herein. However, it should be observed that as the jack shaft 113 rotates, it will shift the card retaining tray 108 to the recording position, and the return spring 114 will subsequently urge the tray 108 back to the loading position.

A solenoid 130 is mounted on the underside of the tray 108 and includes a plunger 131 having an externally threaded "nut" 132 on the outer end thereof. The "nut" 132 is engagable with the threaded section of the jack shaft 113 upon deenergization of the solenoid 130. Thus, upon actuation of the geneva mechanism 124, the solenoid 130 is deenergized to enable engagement of the "nut" 132 with the jack shaft 113. After the tray 108 with the card thereon reaches the recording position, and after recording on the card has occurred in a manner to be hereinafter described, the solenoid 130 is energized, permitting disengagement of the nut 132 with the jack shaft 113. The return spring 114 will then bias the tray 108 to the loading position.

A timing cam 133 is mounted on the cam shaft 121 and is rotatable therewith to engage electrical contacts 134 secured to the bracket 122 on each revolution of the cam shaft 121. Engagement with the contacts 134 will enable the generation of sync pulses which are needed to synchronize the data with the operation of the recording apparatus R.

Also mounted in the housing 100 in upwardly spaced relation to the card retaining tray 108 is a pivotal yoke 140 having a horizontal support wall 141 and a pair vertically extending support plates 142. The yoke 140 is pivotal on a support shaft 143 which extends through apertures 144 formed in the support plates 142. Suitable bearings (not shown) are also located in the apertures 144 in order to provide pivotal movement of the yoke 140 with respect to the shaft 143.

Mounted on the forward end of each of the support plates 144 are marking or so-called "recording heads" 145, each of which is more fully illustrated in FIG. 16. By further reference to FIG. 16, it can be seen that each marking head 145 comprises an outer tubular housing 146 having a tubular contact member 147 extending outwardly of the housing 146 and communicates with a pigment chamber or reservoir 148 formed internally of the housing 146. A suitable flexible conduit 149 can be connected to a source of ferromagnetic particles in a fluidized type bed for introducing the same into the chamber 148. A suitable valve (not shown) may be interposed in the conduit 149 to prevent reverse flow.

The yoke 140 is pivotal about the shaft 143 and is biased into recording position for enabling recording on a credit card c located in the tray 108, by means of a spring 151. The spring 151 operates against the action of a cam 152, which tends to bias the yoke 140 out of recording position with respect to the card c in the retaining tray 108. The cam 152 is mounted on and operable by rotation of the cam shaft 121. Thus, it can be seen that the yoke 140 is operated in time related movement to the movement of the credit card on the retaining tray 108 so that the yoke 140 is shifted to the recording position when the tray 108 and card c thereon reaches the recording position.

Accordingly, the yoke 140 would be pivoted toward the card c at preselected times, that is, when the cam 152 is located in such position that the spring 151 can pull the yoke 140 into the recording position.

It could be observed that the marking heads 145 are located to be in alignment with the two clock tracks $c_1$, $c_2$ of the credit card. Thus, when the credit card c is shifted past the marking heads 145 by means of the drive mechanism 116, the cam 152 is periodically rotated to positions where the marking heads 145 can engage the trackway $c_1$, $c_2$ and deposit the ferromagnetic particles thereon. It can be seen that this periodic movement will be such that a ferromagnetic particle will be deposited in the trackway $c_1$, $c_2$ at each bit position. Accordingly, it is possible to adjust the distance between each bit position, and hence the distance between each clock pulse by carefully regulating the speed of movement of the card c with respect to the pivotal movement of the yoke 40 by selection of screw pitch.

The two vertical support plates 142 are provided with a pair of elongated slots 156 to accommodate a reciprocatively shiftable support plate 157. The plate 157 is urged in one direction by means of a spring 158 affixed to one side wall 104 of the housing 100. The other end of the plate 157 is operatively attached to a solenoid 161 through a yeildable link 162 as illustrated in FIG. 13. Thus, when the solenoid 161 is energized, it will shift the plate 157 to the right, reference being made to FIG. 13 and when the solenoid 161 is deenergized, the plate 157 will be shifted to the left through the action of the spring 162.

Proper alignment of the support plate 157 is maintained by a pin 163 which is secured to the yoke 140 and extends through elongated apertures 164 formed in the flat surface of the plate 157 in the manner as illustrated in FIG. 13.

By reference to FIG. 13, it can be seen that the support plate 157 is longer than the horizontal support wall 141 of the yoke 140 and extends beyond the support plates 142. Secured to each of the transverse ends of the support plate 157 are a pair of upstanding brackets 165, which carry a pair of marking or recording heads 166. The recording heads 166 are more fully illustrated in FIG. 17 and comprise an outer tubular housing 167 having a movable plunger 168 which is tubular and communicates with a reservoir 169 disposed internally in the housing 167. The plunger 168 is biased upwardly within the housing by means of a compression spring 170 bearing against a plate 171, which forms one wall of the reservoir 169. The plunger 168 is provided with a relatively small diameter central bore for communication with the reservoir 169 to receive the fluidized ferromagnetic material and carry the same to the credit card c when in contact therewith. A lug 172 is formed on the exterior portion of the plunger 168 in the manner as illustrated in FIGS. 14 and 16. The support plate 157 is also provided with a pair of notches on its upper surface, proximate the transverse ends thereof. Thus, when the plate 157 is shifted in one direction, the notch will provide a relief for the yoke 140 as it shifts downwardly, but the other end of the plate 157 will be engaged by the yoke 140 and carried downwardly therewith against the action of the compression spring 170. A flexible tubing 174 is connected to a suitable source of fluidized ferromagnetic material and is capable of introducing the ink into the reservoir 169.

Thus, it can be seen that as the support plate 157 is shifted in either direction, it will cause either one or the other of the recording heads 166 to engage the credit card *c*. Furthermore, the recording heads 166 are located in alignment with the two data tracks $d_1$, $d_2$. If the plate 157 is shifted to the right, the yoke 140 will engage the upper surface of the plate 157 on the left hand side thereof, causing a downward shifting movement of the plunger 168 so that the same engages the data track $d_1$ of the credit card C. It can be observed that this engagement will take place only as the yoke 140 is shifted to the recording position. Accordingly, a pulse or magnetic dot will be placed in the data track $d_1$ simultaneously with the recording of magnetic dots on the clock tracks $c_1$, $c_2$, by means of the recording heads 145. As the plate 157 is shifted to the left, reference being made to FIG. 13, then the yoke 140 will engage the upper surface of the plate 157 on the right-hand side thereof, causing a downward shifting movement of the plunger 168. This plunger 168 on the righthand recording head 166 will engage the data track $d_2$ simultaneously with the engagement of the clock tracks $c_1$, $c_2$ by the two recording heads 145. Accordingly, a magnetic dot will be placed in the data track $d_2$ in alignment with the magnetic dots placed in the clock tracks $c_1$, $c_2$.

The various marking heads 145 and 166 may be formed of a material which is capable of being heated by electrical power, and accordingly, each of the heads 145, 166 may be provided with electrical leads 175 for connection to a suitable source of electrical current (not shown). It is therefore possible to imbed the ferromagnetic particles into the surface of the card by heating the particles. It should be recognized that the plastic material forming the credit card *c* cannot be heated since degradation in the embossment and warping of the card may arise. This technique allows a coding with a ferromagnetic material by imbedding the material beneath the normal surface of the credit card, thereby virtually sealing the material in the card surface.

As previously indicated, the recording heads 145 will engage the clock tracks $c_1$, $c_2$ at properly spaced locations, representative of each data bit position. In like manner, either one or the other of the recording heads 166 will engage either one of the data tracks $d_1$, $d_2$ at the same time the two recording heads 145 engage the two clock tracks $c_1$, $c_2$. Therefore, a complete complementary form of data is recorded in the two data tracks $d_1$, $d_2$ on a clock time basis. It can be observed that the support plate 157 is shifted in response to energization of the solenoid 161. The solenoid 161 can be connected to suitable digital controlled elements for energization of the solenoid 161. If the solenoid is energized, this condition would be representative of a pulse in one of the data tracks; whereas, if the solenoid 161 is de-energized, it is representative of a pulse in the other of the data tracks.

It is also possible to provide a modified form of recording system including a recording apparatus R' which is more fully illustrated in FIGS. 19–20 for imprinting the indicia on the credit card *c*. The apparatus R' is similar to the apparatus R with the exception that the marking heads 145, 166 are eliminated. In the place of the marking heads are discharge rods 180 which are circular in cross section and have contact points 181 which are approximately the size of a ferromagnetic data bit. The discharge rods 180 may be grounded through suitable leads through the apparatus R'.

In the modified form of recording system, the entire credit card is charged to a negative polarity. As the card passes in a trackway 182 past the discharge rods 180, the rods 180 will be actuated in the manner previously described in connection with the apparatus R. The contact points 181 of the discharge rods 180 will engage the various tracks of the card to electrically discharge the portions of the card where a data bit is to be recorded.

A fluidized ferromagnetic material of the type previously described carried in a liquid solvent is cascaded across the credit card, such as by means of the cascading system T illustrated in FIG. 19. The solvent may carry any of a number of conventional binders. The ferromagnetic material has also been previously charged to the same negative polarity and charge of the card. Accordingly, the ferromagnetic material will be repelled from the credit card in all areas where the charge has not been removed. The material however, will adhere to the card in the areas where the charge has not been removed. The material however, will adhere to the card in the areas where the change has been removed. The liquid solvent should be a rapidly drying solvent enabling the binder to cause the ferromagnetic particle to adhere to the card in the region where the charge has been removed.

It is also possible to use this system without employment of a binder. Selection of a proper solvent will enable the solvent to slightly etch the surface of the card in the region of particle adhereance thereby permitting the particle to become fused to the surface of the card.

It can be seen that the present invention provides a complete system for recording information bearing indicia on a credit card or similar member in such manner that it can be rapidly and efficiently read. The information is recorded on the credit card by means of the recording apparatus R with clock or sync pulses in each bit position and a data pulse in one of the data tracks in each bit position. The other data track will have the same information in complimentary form. Thus, it can be seen that the information on the credit card, considering the two data tracks and the two clock tracks, has greater than one hundred percent redundancy. In addition, the information cannot be easily altered or counterfeited or obliterated. The information which has been recorded on the credit card can be rapidly accurately read by the card reading apparatus provided herein. The reading apparatus is uniquely designed to read the information recorded on the card c by the recording apparatus. It should be recognized that the recording apparatus of the present invention can be controlled by a computer or by off-line techniques at a card embossing station.

The system of the present invention can be effectively employed for imprinting the data contained on the credit card onto another substrate such as a purchase order, ticket or the like. The ticket for example, would be provided with a magnetic strip such as in airline tickets. The ticket would be disposed over the credit card in such manner that the magnetic strip is located directly over the magnetic coding on the credit card. A recording head of conventional construction with an AC biasing signal would be passed over the magnetic strip and magnetic coding on the credit card to cause transferrence of the coding on the credit card to the magnetic strip on the ticket. The AC field drives the ferromagnetic material on the paper by an amount which is the vector sum of the instantaneous fields from the magnetic information on the credit card and the AC field from the head at the time of departure of the card and ticket combination from the gap area of the biasing head.

It should be understood that prior to the application of the said bias field, the ferromagnetic material on the card has previously been exposed to a DC magnetic field in such fashion that the remanent magnetic induction is of a value which approaches the intrinsic coercivity of said ferromagnetic material and that the physical orientation of such DC magnetic field would be such as to produce a net remanent induction in virtual alignment with the data and clock track axis.

PROCESS

The process embodied in the credit card recording and reading system of the present invention is actually set forth in the description of the apparatus and in the operation thereof. However, the process of the present invention can best be understood by reference to FIG. 21 which schematically illustrates the various steps taking place. In this figure, the rectangular blocks represent a function which takes place, the circular blocks represents an action which takes place or occurs in a period of time; and the diamond shaped blocks represent a decision-making element, either a human decision, or a decision made automatically by the apparatus.

In the process as schematically illustrated in FIG. 21, the data to the recording apparatus would be introduced by punched cards, magnetic tape or other common digital techniques. As previously indicated, a sync pulse will always be recorded for each bit position on the card. When data is presented at sync pulse time, the data present decision making element will determine whether a "1" or a "0" is present. If a "1" is present, the solenoid on the recording apparatus will be energized or "set." If a data bit "1" is not present, then a "0" is present and the solenoid will not be energized. The sync pulses from the printing cam are delayed so that the data pulses from the computer will arrive at the printing mechanism at the proper time. These data are printed on the credit card c with clock pulses in each bit position on the card and complimentary data bits on the two data tracks.

The data on the two tracks of the credit card and the sync pulses on the two sync tracks would be read as schematically illustrated by the read function in FIG. 21. The clock pulse decision making element would decide if clock pulses were present at coincident times in each of the sync tracks. If the sync pulses are not present at coincident times, a delay factor is introduced until the sync pulses from each of the sync tracks are coincident. If the sync pulses are present at coincident times, (a yes decision) then two decision making elements decide if a data bit is present. It is to be noted that these latter two decision making elements are schematically connected to the read functions. If a data bit is present in one of these decision making elements, and is not present in the other of these decision making elements, then the data are different. It is to be noted, that a "1" present in one decision making element and a "0" present in the other decision making element would be representative of the complimentary forms of data on the two data tracks.

If the decision making element decides that the data are alike, then an error exists since a pair of "1's" or a pair of "0's" could not exist on the same bit positions in each of the data tracks. If the data are different, i.e., a "1" and a "0," then the "decide '1' or '0'" decision making element will decide if a true "1" or a true "0" is present. At this point in time, further decision making by the simultaneously clock pulse decision making element will be inhibited.

It can be observed that by introducing a delay factor and a comparator, the data read from the card can be compared with the data recorded on the card to determine if an error occurred either in the recording or reading process. For example, the presence of a "1" read from the card should match the "1" recorded on the card. To this extent, it is possible to determine if the information on the card is correct.

It should be recognized that a read error checking function and a parity check could be added to the functional diagram illustrated in FIG. 21. In the event that a parity checking function were added, the output of the flip-flops would be examined for an odd or even number of binary ones and advise if bits of information were gained or lost during the process. If a parity error is detected, then a stop function would take place.

It should be understood that changes and modifications can be made in the form, construction, arrangement and combination of parts presently described and pointed out without departing from the nature and principle of our invention.

Having thus described our invention, what we desire to claim and secure by letters patent is:

1. An information bearing member capable of rendering information recorded thereon in digital type format, said member comprising a surface having a first clock pulse track with a plurality of bit positions thereon, a clock pulse in each bit position, a first data track having a plurality of bit positions corresponding to the bit positions on said first clock pulse track, binary type data pulses recorded in certain of the bit positions in said first data track, a second clock pulse track having a plurality of bit positions corresponding to the bit positions in said first clock pulse track, a clock pulse in each bit position on said second clock pulse track, a second data track having a plurality of bit positions corresponding to the bit positions in said first data track, and binary type data pulses recorded in certain of the bit positions on said second data track in complimentary from to the data pulses in the bit positions on said first data track so that a data pulse exists in a bit position on said second data track where no data pulse exists in a corresponding bit position on said first data track.

2. The information bearing member of claim 1 further characterized in that the member is formed of a plastic material.

3. The information bearing member of claim 1 further characterized in that the member is a credit card.

4. The information bearing member of claim 1 further characterized in that the first data track and first clock pulse track are spaced from the second data track and second clock track.

5. The information bearing member of claim 1 further characterized in that all four of said tracks are located in substantially parallel relationship and that the first data track and first clock pulse track are spaced from the second data track and second clock pulse track.

6. The information bearing member of claim 1 further characterized in that each of said pulses are recorded thereon with magnetic material.

7. The information bearing member of claim 1 further characterized in that each of the data pulses in said first and second data tracks form a plurality of digital characters and each of the data pulses in said first and second data tracks are repeated in said respective tracks to form a second set of the same digital characters therein in spaced relation to the first named set of digital characters.

8. The information bearing member of claim 1 further characterized in that the member is formed of a plastic material.

9. The information bearing member of claim 1 further characterized in that the member is a credit card.

10. The information bearing member of claim 1 further characterized in that the first data track and first clock pulse track are spaced from the second data track and second clock track.

11. An information bearing member capable of rendering information recorded thereon in digital type format, said member comprising a surface having a first clock pulse track with a plurality of bit positions thereon, a clock pulse in each bit position, a first data track having a plurality of bit positions corresponding to the bit positions on said first clock pulse track, binary type data pulses recorded in certain of the bit positions in said first data track, a second clock pulse track having a plurality of bit positions corresponding to the bit positions in said first clock pulse track, a clock pulse in each bit position on said second clock pulse track, a second date track having a plurality of bit positions corresponding to the bit positions in said first data track, and binary type data pulses recorded in certain of the bit positions on said second data track in complimentary form to the data pulses in the bit positions on said first data track so that a data pulse exists in data bit position on said second data track where no data pulse exists in a corresponding bit position on said first data track, each of said pulses being recorded with a finely divided ferromagnetic material having no particular value of orientation or magnitude or remanent induction and which are capable of being read by a low resolution variable reluctance device.

* * * * *